United States Patent
Ponticiello et al.

(10) Patent No.: US 9,914,827 B2
(45) Date of Patent: Mar. 13, 2018

(54) CONCENTRATED POLYMERIC COMPOSITIONS OF VINYL AROMATIC POLYMERS AND/OR COPOLYMERS

(71) Applicant: Versalis S.P.A., S. Donato Mil.se (IT)

(72) Inventors: Antonio Ponticiello, Mozzecane (IT); Attilio Arienti, Mantova (IT); Francesco Pasquali, Verona (IT)

(73) Assignee: Versalis S.p.A., San Donato Milanese (IT)

( * ) Notice: Subject to any disclaimer, the term of this patent is extended or adjusted under 35 U.S.C. 154(b) by 195 days.

(21) Appl. No.: 14/432,907

(22) PCT Filed: Oct. 17, 2013

(86) PCT No.: PCT/EP2013/071773
§ 371 (c)(1),
(2) Date: Apr. 1, 2015

(87) PCT Pub. No.: WO2014/063993
PCT Pub. Date: May 1, 2014

(65) Prior Publication Data
US 2015/0259521 A1    Sep. 17, 2015

(30) Foreign Application Priority Data

Oct. 24, 2012   (IT) .............................. MI2012A1808

(51) Int. Cl.
| | |
|---|---|
| *C08L 25/08* | (2006.01) |
| *C08J 9/16* | (2006.01) |
| *C08L 25/06* | (2006.01) |
| *C08J 9/00* | (2006.01) |
| *C08J 9/14* | (2006.01) |
| *C08J 9/224* | (2006.01) |
| *C08J 9/232* | (2006.01) |
| *C08J 9/20* | (2006.01) |

(52) U.S. Cl.
CPC ............ *C08L 25/08* (2013.01); *C08J 9/0019* (2013.01); *C08J 9/0061* (2013.01); *C08J 9/0066* (2013.01); *C08J 9/0095* (2013.01); *C08J 9/141* (2013.01); *C08J 9/16* (2013.01); *C08J 9/20* (2013.01); *C08J 9/224* (2013.01); *C08J 9/232* (2013.01); *C08L 25/06* (2013.01); *C08J 2201/022* (2013.01); *C08J 2201/03* (2013.01); *C08J 2201/036* (2013.01); *C08J 2203/14* (2013.01); *C08J 2203/182* (2013.01); *C08J 2325/04* (2013.01); *C08J 2325/08* (2013.01); *C08J 2425/04* (2013.01); *C08J 2425/14* (2013.01); *C08J 2433/14* (2013.01); *C08J 2463/04* (2013.01); *C08L 2201/02* (2013.01)

(58) Field of Classification Search
CPC ...................................................... C08L 25/08
See application file for complete search history.

(56) References Cited

U.S. PATENT DOCUMENTS

| | | | |
|---|---|---|---|
| 5,041,465 A | 8/1991 | Sonnenerg | |
| 5,717,001 A | 2/1998 | Books et al. | |
| 2005/0020737 A1 | 1/2005 | Jung et al. | |
| 2005/0123638 A1 | 6/2005 | Casalini | |
| 2005/0158546 A1* | 7/2005 | Shizuka | H01M 4/0404 428/402 |
| 2007/0172408 A1* | 7/2007 | Takagi | C01B 31/02 423/445 R |
| 2007/0221890 A1* | 9/2007 | Gan | C07F 9/657172 252/601 |
| 2011/0046249 A1 | 2/2011 | Ponticiello et al. | |
| 2011/0284793 A1 | 11/2011 | Ponticiello et al. | |
| 2012/0091388 A1 | 4/2012 | Felisari | |
| 2012/0164373 A1* | 6/2012 | Spencer | C08G 59/1488 428/116 |
| 2015/0299410 A1* | 10/2015 | Casalini | C08F 212/08 521/59 |

FOREIGN PATENT DOCUMENTS

| | | |
|---|---|---|
| WO | 0129124 | 4/2001 |
| WO | WO2009133167 | 11/2009 |
| WO | WO2010/141400 A1 | 12/2010 |
| WO | WO2010140882 | 12/2010 |

OTHER PUBLICATIONS

International Search Report and Written Opinion dated Jan. 15, 2014 for PCT/EP2013/071773.
Fitzer, E., et al. "Recommended terminology for the description of carbon as a solid (IUPAC Recommendations 1995)." Pure and Applied Chemistry 67.3 (1995): 473-506.
Journal of Macromolecular Science, Review in Macromolecular Chemistry and Physics C31 (263) 215-299 (1991).

* cited by examiner

*Primary Examiner* — Megan McCulley
(74) *Attorney, Agent, or Firm* — Abel Law Group, LLP

(57) ABSTRACT

The present invention relates to a concentrated polymeric composition which comprises: a) vinyl aromatic polymers and/or copolymers in an amount ranging from 10% to 90% by weight, calculated with respect to the overall composition, with respect to the overall composition, b) at least one compound containing epoxy functional groups in an amount ranging from 0.01% to 5% by weight, calculated with respect to the overall composition, with respect to the overall composition, c) at least one infrared absorbing agent, in an amount ranging from 10% to 90% by weight, calculated with respect to the overall composition, with respect to the overall composition.

12 Claims, No Drawings

CONCENTRATED POLYMERIC COMPOSITIONS OF VINYL AROMATIC POLYMERS AND/OR COPOLYMERS

The present invention relates to concentrated compositions (master batch) of vinyl aromatic polymers and/or copolymers which can be subsequently used in processes for the preparation of self-extinguishing expandable compositions of vinyl aromatic polymers and/or copolymers. The present invention also relates to said self-extinguishing compositions and a process for the preparation of said self-extinguishing compositions.

In the present patent application, all the operative conditions indicated in the text should be considered as being preferred conditions even if not expressly specified.

The expandable granules obtained starting from polymeric compositions of vinyl aromatic polymers having a reduced thermal conductivity, such as, for example, expanded polystyrene (EPS), contain infrared absorbing agents which mitigate the propagation of heat.

In order to also give said expandable granules self-extinguishing properties, flame-retardant agents such as organo-brominated compounds, for example, hexabromocyclododecane, are usually introduced into the starting polymeric compositions.

Unfortunately, infrared absorbing agents such as coke, graphite and carbon black, and their impurities, significantly accelerate the degradation of the organo-brominated compounds introduced as flame-retardants, with a consequent production of hydrobromic acid (HBr). The presence of hydrobromic acid in the expandable granules causes corrosive phenomena on the part of the plant, with a consequent deterioration in the metallic parts and a deterioration in the characteristics of the behaviour and during transformation of the granules obtained.

During the preparation of expandable polystyrene granules, without athermanous fillers, in order to limit the degradation of the organo-brominated compounds, stabilizing agents based on tin are normally added, such as, for example, tin dibutyl maleate, or compounds containing epoxy functional groups which act as acid scavengers by removing HBr from the reaction environment. Alternatively, chemical compounds with basic properties can be used for neutralizing the hydrobromic acid produced. Another known solution envisages the use of infrared absorbing agents, characterized by a high degree of purity (as described in patent WO 2009/133167) wherein degree of purity refers to a reduced content of metals present in the ashes. In this way, the brominated flame-retardants undergo a less intense degradation.

Tetrabromobisphenol A bis-2,3 dibromopropylether is a known compound brominated flame-retardant used in various polymeric compositions, as can be observed from ample patent literature.

WO 2010/140882 describes particles of expandable polystyrene (EPS) containing a polymeric composition which comprises EPS, brominated polystyrene as flame-retardant in a quantity ranging from 0.5% by weight to 5% by weight, calculated with respect to the styrene polymer, and at least one synergic compound selected from peroxides or brominated compounds of bisphenol, preferably tetrabromide bisphenol A bis(2,3 dibromo propyl ether), and combinations thereof. In this way, the self-extinguishing properties of expandable polystyrene are optimized, allowing the fire test DIN 4101-B2 to be passed and reducing the environmental impact of these exhausted materials.

US 2005/0020737 describes a styrene resin modified with rubber containing:
  100 parts by weight of a styrene resin modified with rubber,
  0.2-20 parts by weight of a flame-retardant which comprises from 0.1 to 10 parts by weight of a compound selected from tetrabromobisphenol A bis(2,3 dibromo propyl ether), hexabromocyclododecane and mixtures thereof,
  0.1-3 parts by weight of calcium stearate as lubricant.

This composition has the purpose of reinforcing the extinguishing properties, increasing the heat resistance and resistance to climatic agents, reducing the decolorization and deterioration of the styrene resins.

U.S. Pat. No. 5,717,001 relates to a composition which contains a styrene polymer, a halogenated flame-retardant such as, for example, tetrabromobisphenol A bis(2,3 dibromo propyl ether), a zeolite A as heat stabilizer and an expanding agent. The composition described prevents problems relating to colouring and/or viscosity in the polymeric compositions based on styrene polymers exposed to high temperatures.

WO 01/29124 relates to a polymeric composition comprising:
  expandable or non-expandable vinyl aromatic polymers,
  a composition of flame-retardants containing:
    tetrabromobisphenol A bis(2,3 dibromo propyl ether),
    an alkyltin mercaptoalkanoate, and
    a zeolite adjuvant.

In this way, the thermal stability of the flame-retardant is increased and the flame-retardants become interchangeable in the compositions of high-impact and expandable vinyl aromatic polymers.

Compounds containing epoxy functional groups are known acid scavenger additives which are used in various polymeric compositions, among which those of vinyl aromatic polymers, as can be observed from ample patent literature.

Epoxy resins belong to the category of thermosetting resins, originally obtained by the condensation of epichlorohydrin with bisphenol A. Epoxy resins are currently composed of low-molecular-weight diglycidyl ethers of bisphenol A.

Depending on the molecular weight, epoxy resins can be in the liquid or solid state. The cross-linking processes of these resins are favoured by compounds containing functional amine groups, polyamides, anhydrides or other catalysts.

Solid epoxy resins can be modified using other resins and/or unsaturated fatty acids.

Epoxy NovolaK Resins are resins obtained from the reaction of epichlorohydrin with a condensate of phenol formaldehyde. These resins are known as thermoplastics and are in a partial crosslinking state.

Bisphenol-based epoxy resins contain more than 2 epoxy groups for each molecular, epoxy NovolaK resins can contain 7 or more of these groups, producing highly crosslinked structures which improve their properties.

In the present patent application, compounds having epoxy functional groups refer to compounds containing at least one group consisting of an oxygen atom directly bound to two carbon atoms. In the present patent application, "compounds containing epoxy functional groups" and "epoxy compounds" are equivalent terms and concepts.

Epoxy compounds are normally dosed together and with the same procedure with which other additives are incorporated, such as for example infrared absorbing agents, flame-retardant agents and nucleating agents.

Epoxy compounds are normally introduced into a main polymeric stream or incorporated in the polymer stream by means of a side (secondary) polymeric stream using a silo and a measuring device specifically destined for dosing the additive. Specific measuring devices and silos are normally also used for the dosing of the single additives which form part of the side polymeric stream, such as: infrared absorbing agents (often dosed in masterbatch form, on a polystyrene base) flame-retardants, nucleating agents.

In the situation described above, the epoxy groups act exclusively or prevalently as acid scavengers, they are consequently capable of neutralizing the hydrobromic acid according to the following reaction (1):

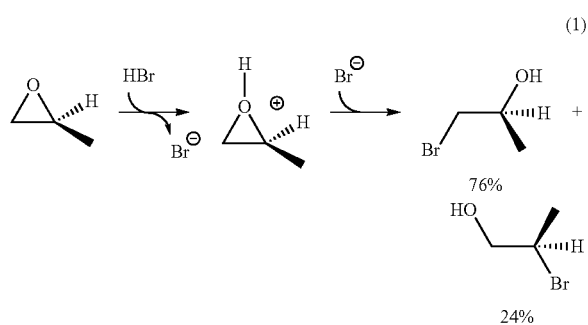

(1)

Reaction (1) allows the neutralization of the hydrobromic acid present in the expandable granules of expandable polystyrene, produced as a result of the degradation undergone by organo-brominated compounds, with a consequent reduction in the concentration of hydrobromic acid.

SUMMARY

The Applicant has observed that by introducing epoxy compounds together with other additives according to the known procedures of the state of the art, said epoxy compounds must reach a concentration ranging from about 1% to about 1.5% weight/weight with respect to the weight of the expandable granules of vinyl aromatic polymers produced, to reduce the content of HBr from about 2000 ppm to about 300 ppm, in the expandable granules produced containing 5% weight/weight of petroleum coke and 2% weight/weight of hexabromocyclododecane (HBCD) (reference formulation).

The Applicant has surprisingly observed that by directly incorporating at least one compound containing epoxy functional groups, characterized by a high solubility in vinyl aromatic polymers, into a concentrated polymeric composition (or Master Batch) based on vinyl aromatic polymers and/or copolymers and containing infrared absorbing additives, a significant reduction in the dosage of said compounds can be observed, with the same performances, in terms of a decrease in the content of hydrobromic acid in the expandable granules of vinyl aromatic polymers produced.

An embodiment of the present invention therefore relates to a concentrated polymeric composition or Master Batch comprising:
a. vinyl aromatic polymers and/or copolymers in an amount ranging from 10% to 90% by weight, with respect to the overall composition,
b. at least one compound containing epoxy functional groups in an amount ranging from 0.01% to 5% by weight, with respect to the overall composition,
c. at least one infrared absorbing agent, in an amount ranging from 10% to 90% by weight, with respect to the overall composition.

The Applicant has also observed that the Master Batch described and claimed in the present patent application allows self-extinguishing expandable granules to be obtained, by means of successive transformation processes, and subsequently expanded articles which are able to pass the flame-retardant test, effected according to the standard DIN 4102 B2, regardless of the degree of purity of the infrared absorbing agent present, and this offers considerable advantages in terms of a reduction in the cost of the final formulation.

The flame heights measured by subjecting the expanded end-products based on vinyl aromatic polymers and/or copolymers and produced starting from a Master Batch of infrared absorbing agent (or concentrated composition), prepared according to what is described in the present patent application, to the flame-retardant test (standard DIN 4102 B2), are lower than what is observed on evaluating the reference samples.

The reduction in the dosage of the epoxy compound is evident with any flame-retardant used during the preparation processes of the self-extinguishing expandable granules.

The present invention advantageously allows a significant reduction in the content of hydrobromic acid in the expandable granules produced containing vinyl aromatic polymers without having to introduce thermal stabilizing agents based on tin, with an unacceptable HSE profile, or compounds with a neutralizing action (such as, for example, $CaO/Ca(OH)_2$) which form corrosive bromine salts in the presence of humidity.

DETAILED DESCRIPTION

For the purposes of the present invention, the term "comprise" or "include" also comprises the case "essentially consisting of" or "only consisting in". In the present patent application w/w is equivalent to weight/weight.

A fundamental aspect of the present invention is the preparation of the Master Batch or concentrated polymeric composition which can be subsequently used in processes for the preparation of a compound or polymeric compositions, and more specifically in processes for the preparation of self-extinguishing expandable compounds or compositions of vinyl aromatic polymers and/or copolymers.

The present invention therefore relates to a Master Batch, or a concentrated polymeric composition comprising:
a) vinyl aromatic polymers and/or copolymers in an amount ranging from 10% to 90% by weight, calculated with respect to the overall composition, with respect to the overall composition,
b) at least one compound containing epoxy functional groups in an amount ranging from 0.01% to 5% by weight, calculated with respect to the overall composition, with respect to the overall composition,
c) at least one infrared absorbing agent, in an amount ranging from 10% to 90% by weight, calculated with respect to the overall composition, with respect to the overall composition.

The present invention also relates to a self-extinguishing expandable composition of vinyl aromatic polymers and/or copolymers comprising:

A) vinyl aromatic polymers and/or copolymers in an amount ranging from 50% to 100% by weight,
B) at least one expanding agent,
C) at least one infrared absorbing agent,
D) at least one halogenated flame-retardant agent,
E) at least one compound containing epoxy functional groups characterized by a solubility in styrene, measured at a temperature of 25° C., higher than 5 g/100 g, preferably higher than 20 g/100 g.

A Master Batch is defined as a concentrated composition of an additive, for example an infrared absorbing agent, and a polymer.

A Master Batch containing infrared absorbing agents is normally produced by means of an extrusion process in which an infrared absorbing agent, normally in powder form, is added to the molten polymer.

The dosage of epoxy compounds during the preparation phase of the Master Batch modifies the physico-chemical characteristics of the infrared absorbing agent contained therein. During the preparation of the Master Batch, in fact, the infrared absorbing agent and the compound containing epoxy functional groups are present in high concentrations and this aspect favours the neutralization of the functional groups present on the surface of the infrared absorbing agent on the part of the epoxy functional groups. The dosage of epoxy compounds according to the present invention allows a significant reduction in the quantity of epoxy compound necessary for obtaining an equivalent effect to that obtained when the epoxy compound is dosed together with other additives according to the procedures known in the state of the art. In particular, the reduction in the content of epoxy compounds in the compositions of self-extinguishing expandable vinyl aromatic polymers and/or copolymers described and claimed in the present text is about 80%.

By dosing the epoxy compounds during the preparation of the Master Batch, a reactive extrusion is effected with a consequent modification of the physico-chemical characteristics of the infrared absorbing agent together with a decrease in the surface reactivity of the same infrared absorbing agent. In this way, the halogenated flame-retardants incorporated in the expandable polymeric compositions described and claimed in the present text, undergo a less intense degradation.

For the purposes of the present invention, the epoxy compounds are selected from those which are homogeneously dispersed in the vinyl aromatic polymer, and must therefore have a solubility in styrene greater than 5 g/100 g, preferably greater than 20 g/100 g, (measured at a temperature of 25° C.)

Said epoxy compounds are preferably selected from styrene-glycidylmethacrylate copolymers preferably having a weight molecular average weight (Mw) ranging from 1,000 to 300,000 Daltons, and an epoxy equivalent weight (WPE) ranging from 10 to 5,000 g/Eq, and mixtures thereof, NovolaK multifunctional organophosphorus epoxy resins, obtained by reacting 9,10 dihydro-9-oxa-10-phosphophenanthrene-10-oxide with multifunctional epoxy resins. The phosphorous content in these multifunctional organophosphorus epoxy resins can vary from 1 to 15% w/w, whereas the epoxy equivalent weight (WPE) can range from 10 to 5,000 g/Eq.

The infrared absorbing agent is selected from petroleum coke, graphite or carbon black and combinations thereof, preferably petroleum coke obtained by means of a fractionated distillation process of petroleum and subsequently subjected to calcination process.

In a preferred aspect, the coke is present in a quantity ranging from 10% to 90% by weight in the concentrated compositions or master batch.

The petroleum coke is available as a finely subdivided powder with a powder particle size (MT50) ranging from 0.5 µm to 100 µm, preferably from 2 µm to 20 µm. The particle size (MT50 or $d_{50}$) is measured with a laser granulometer and is the diameter which corresponds to 50% by weight of particles having a smaller diameter and 50% by weight of particles having a larger diameter. Diameter refers to the particle size measured with a laser granulometer as described above. Coke is produced by the pyrolysis of organic material and at least partly passes through a liquid or liquid-crystalline state during the carbonization process. The starting organic material is preferably petroleum, carbon or lignite. The coke used in the present invention is more preferably the carbonization product of the high-boiling fraction of hydrocarbons coming from the distillation of petroleum, conveniently known as heavy residual fraction. This type of coke is obtained starting from the coking of the heavy residual fraction, an operation carried out at a high temperature that still produces some light fractions and a solid (petroleum coke). The petroleum coke thus obtained, is calcined at a temperature ranging from 1000 to 1600° C. (calcined coke). If a heavy residual fraction rich in aromatic components is used, a coke with a needle-like crystalline structure (needle coke) is obtained, after calcination at 1800-2200° C. The coke used in the present invention can belong to the following types: green coke, coal-derived pitch coke, delayed coke, fluid coke, needle coke, premium coke, calcined coke, shot, sponge. Greater details on coke, the production methods and characterization of the various grades commercially available can be found in internet, in the site: goldbook.iupac.org or in Pure Appl. Chem., 1995, Vol. 67, N. 3, pages 473-506 "Recommended terminology for the description of carbon as a solid (IUPAC Recommendations 1995)".

In the self-extinguishing compositions described and claimed in the present text, the carbon black can be present in a quantity ranging from 0.01% to 25% by weight, preferably from 0.05% to 20% by weight, more preferably from 0.1% to 10% by weight, said quantity being calculated with respect to the polymer and/or copolymer (A).

In the self-extinguishing compositions described and claimed in the present text, the graphite, natural or synthetic, can be present in a quantity ranging from 0.01% to 20% by weight, preferably from 0.05% to 8% by weight, more preferably from 0.1% to 10% by weight, said quantity being calculated with respect to the polymer and/or copolymer (A).

In the self-extinguishing compositions described and claimed in the present text, the petroleum coke can be present in a quantity ranging from 0.01% to 20% by weight, more preferably from 0.1% to 10% by weight, said quantity being calculated with respect to the polymer and/or copolymer (A).

The carbon black preferably has an average diameter (d50), measured with a laser granulometer, ranging from 30 nm to 1000 nm. The graphite can be selected from natural, synthetic, expanded, expandable graphite, and mixtures thereof. The graphite particles can have a maximum particle-size (d50), measured with a laser granulometer, ranging from 0.05 µm to 100 µm, preferably from 1 µm to 8 µm, with a surface area of 5-30 m²/g, measured according to ASTM D-3037-89 (BET). The petroleum coke is in particle form with an average particle diameter (d50) ranging from 0.5 µm to 100 µm, preferably from 2 µm to 8 µm, and a surface area ranging from 5 m²/g to 200 m²/g, preferably from 8 m²/g to 50 m²/g measured according to ASTM D-3037-89 (BET).

The infrared absorbing agent can have a certain degree of purity, calculated on the basis of its ash content.

For the purposes of the present invention, infrared absorbing agents with an extremely variable degree of purity, expressed as ash content, can be advantageously used. Preferably, the infrared absorbing agents adopted in the present invention may have a purity degree, expressed as ash content, also higher than 0.2% w/w, with respect to the absorbing agent, evaluated according to ASTM DIN 51903, or even higher than 0.6% w/w and up to 5% w/w.

Petroleum coke is advantageously used in the present invention, which can have a purity degree, expressed as ash content, also higher than 0.2% w/w, with respect to the absorbing agent, evaluated according to ASTM DIN 51903, or even higher than 0.6% w/w and up to 5% w/w.

Patent application WO 2009/133167 describes the advantages obtained in terms of improvement in the flame-retardant properties for expandable styrene polymers containing graphite or carbon black, characterized by a reduced metal content in the ashes, and specifically a metal content ranging from 0.0001% to 2% by weight, calculated with respect to the weight of the flame retardant. The examples also show that with the same ash content in the graphite, the metal content in the ashes must be significantly reduced to allow the expandable composition to pass the test DIN 4102 B2.

The present invention, on the other hand, advantageously allows self-extinguishing polymeric compositions to be prepared, containing infrared absorbing agents, preferably petroleum coke, which are not necessarily characterized by a high degree of purity, in which the ash content can be even higher than 0.2% w/w, or even higher than 0.6% w/w and up to 5% w/w. The self-extinguishing expandable compositions, object of the present invention, pass the flame-retardant test, effected according to the standard DIN 4102 B2, also when infrared absorbing agents with a high ash content are introduced into the polymeric matrix.

The term vinyl aromatic polymers and/or copolymers, as used in the present text, refers to polymeric products having a weight average molecular weight (MW) ranging from 50,000 to 300,000, preferably ranging from 70,000 to 220,000. These vinyl aromatic polymers can be obtained by polymerizing a mixture of monomers which comprises from 50% to 100% by weight, preferably from 75% to 98% by weight, of one or more vinyl aromatic monomers, and at least one monomer copolymerizable with the vinyl aromatic monomers, homogeneously englobed in the polymer in a quantity ranging from 0% to 50% by weight, preferably from 2% to 25% by weight.

The vinyl aromatic monomers can be selected from those corresponding to the following general formula (I):

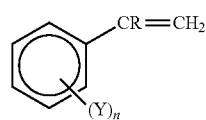

(I)

wherein R is a hydrogen or a methyl group, n is zero or an integer ranging from 1 to 5 and Y is a halogen, preferably selected from chlorine or bromine, or an alkyl or alkoxyl radical having 1 to 4 carbon atoms. Examples of vinyl aromatic monomers having the general formula (I) are: styrene, α-methylstyrene, methylstyrene, ethylstyrene, butylstyrene, dimethylstyrene, mono-, di-, tri-, tetra- and penta-chlorostyrene, bromostyrene, methoxystyrene, acetoxystyrene. Preferred vinyl aromatic monomers are styrene and α-methylstyrene. The vinyl aromatic monomers having general formula (I) can be used alone or in a mixture up to 50% by weight, preferably from 2% to 25% by weight, with other co-polymerizable monomers. Examples of these monomers are (meth)acrylic acid, $C_1$-$C_4$ alkyl esters of (meth)acrylic acid such as methyl acrylate, methyl methacrylate, ethyl acrylate, ethyl methacrylate, isopropyl acrylate, butyl acrylate, amides and nitriles of (meth)acrylic acid such as acrylamide, methacrylamide, acrylonitrile, methacrylonitrile, butadiene, ethylene, divinyl benzene, maleic anhydride. Preferred co-polymerizable monomers are acrylonitrile and methyl methacrylate.

For the purposes of the present invention, the flame-retardant agent is selected from brominated compounds, chlorinated compounds, brominated polymers or copolymers, or a mixture thereof, preferably organo-brominated compounds, organo-chlorinated compounds. The flame-retardant agent is even more preferably selected from hexabromocyclododecane, tetrabromobisphenol A bis-2,3 (dibromopropylether), brominated styrene-butadiene copolymer (EMERALD 3000 produced by CHEMTURA) and 1,1'(isopropylidene)bis[3,5-dibromo-4-(2,3-dibromo methyl-propoxy)benzene.

The flame-retardant agent is even more preferably tetrabromobisphenol A bis-2,3 (dibromopropylether).

The Applicant has in fact noted that the contemporaneous presence of tetrabromobisphenol A bis-2,3 (dibromopropylether) and at least one epoxy compound, introduced in the preparation phase of the Master Batch according to what is described and claimed in the present invention, allows the following advantages to be obtained:
 a significant reduction in the dosage of epoxy compound,
 a significant improvement in the fire behaviour tests (DIN 4102) of the resulting expanded articles,
 a significant reduction in the concentration of HBr in the expandable granules, regardless of the degree of purity of the infrared absorbing agent present.

Any expanding agent capable of being incorporated in a polymer can be used in the present invention. Preferably, the expanding agents may be liquid substances with a boiling point ranging from 10° C. to 80° C., preferably from 20° C. to 60° C. Preferred expanding agents are aliphatic or cycloaliphatic hydrocarbons containing from 3 to 6 carbon atoms such as n-pentane, iso-pentane, cyclopentane, butane, isobutane or mixtures thereof; halogenated derivatives of aliphatic hydrocarbons containing from 1 to 3 carbon atoms, such as dichlorodifluoromethane, 1,2,2-trifluoroethane and 1,1,2-trifluoroethane; carbon dioxide.

The expanding system is present in a quantity ranging from 3% to 10% by weight, said quantity being calculated with respect to the polymer and/or copolymer (A). In order to favour the retention of the expanding agent in the polymer (A), additives capable of forming bonds of both the weak type (for example hydrogen bridges) and strong type (for example acid-base adducts) can be used with the expanding agent. These additives are preferably selected from methyl alcohol, isopropyl alcohol, dioctylphthalate, dimethyl carbonate, derivatives containing an amine group.

Further conventional additives can be added to the compositions, object of the present invention, such as additives generally used with traditional vinyl aromatic polymers such as pigments, stabilizing agents, antistatic agents and detaching agents.

The sole presence of the compound containing epoxy functional groups in the master batch, object of the present invention, can reduce the content of hydrobromic acid by at least ⅓ in the expanded articles obtained in the subsequent transformation processes, with respect to cases in which the epoxy compound is not introduced into the Master Batch but according to other procedures known in the state of the art. The combined action of the epoxy compound with tetrabromobisphenol A bis-2,3 (dibromopropylether) in the self-extinguishing expandable compositions, object of the present invention, allows the content of hydrobromic acid to be at least 30 times reduced, when the expandable granules are produced with the extrusion process. Furthermore, this particular combination, epoxy compound and tetrabromobisphenol A bis-2,3 (dibromopropylether), solves the critical aspects linked to the necessity of using "costly" infrared absorbing agents, characterized by a high degree of purity, normally used for producing expanded end-products containing vinyl aromatic polymers capable of passing the flame-retardant test (DIN 4102 B2). This combination has allowed the best result to be obtained in terms of a reduction in the content of bromides in the expandable granules.

A further object of the present invention therefore relates to a process for preparing in continuous mass a self-extinguishing expandable composition as described and claimed in the present text. Said process comprises the following phases:
 i. mixing the following compounds together:
   a. vinyl aromatic polymers and/or copolymers in amounts ranging from 10% to 90% by weight, with respect to the overall mixture,
   b. at least one compound containing epoxy functional groups in amounts ranging from 0.01% to 5% by weight with respect to the overall mixture,
   c. at least one infrared absorbing agent in amounts ranging from 10% to 90% by weight, with respect to the overall mixture,
   so as to form a concentrated polymeric composition;
 ii. incorporating said concentrated polymeric composition in a first stream containing vinyl aromatic polymers and/or copolymers in the molten state, at least one flame-retardant additive and possibly at least one expanding agent so as to form a side or secondary polymeric stream;
 iii. if the vinyl aromatic polymer and/or copolymer is in granules, heating said polymer and/or copolymer to a temperature higher than the relative melting point, forming a molten stream before incorporating the flame-retardant additive and possibly the expanding agent;
 iv. incorporating said side (or secondary) polymeric stream possibly together with the expanding agent, in a second stream, or main polymeric stream, containing vinyl aromatic polymers and/or copolymers in the molten state, thus forming the self-extinguishing expandable composition.

During the process in continuous mass, object of the present invention, the expanding agent can preferably be incorporated in the side polymeric stream, or in the main polymeric stream when the side polymeric stream is mixed therewith, or after incorporating the side stream with the main polymeric stream.

At the end of the process described above, the self-extinguishing expandable composition of polymers and/or copolymers, object of the present patent application, is obtained, with which expandable granules can be produced, after suitable granulation, in which the compounds containing epoxy functional groups are present in a quantity not higher than 0.5% w/w, preferably not higher than 0.2 w/w, and in which the content of infrared absorbing agent ranges from 0.05% by weight to 25% by weight.

When the flame-retardant is tetrabromobisphenol A bis-2,3 (dibromopropylether), its content in the expandable granules ranges from 1 to 6% by weight.

Said expandable granules have a spheroidal form and an average diameter ranging from 0.3 mm to 2.5 mm, preferably ranging from 0.7 mm to 2 mm.

Expanded articles containing the self-extinguishing polymeric compositions, object of the present patent application, can be obtained from said expandable granules, preferably having a density ranging from 5 g/l to 50 g/l, and a thermal insulation capacity, expressed by a thermal conductivity ranging from 25 mW/mK to 50 mW/mK measured according to the standard DIN 52612.

Finally, a further object of the present invention relates to a polymerization process in aqueous suspension for producing self-extinguishing polymeric compositions according to what is described and claimed in the present patent application, wherein the dosage of the infrared absorbing agents, preferably petroleum coke, is obtained by incorporation, in a polymerization mixture, of a concentrated polymeric composition comprising:
 a. vinyl aromatic polymers and/or copolymers in an amount ranging from 10% to 90% by weight, with respect to the overall composition,
 b. at least one compound containing epoxy functional groups in an amount ranging from 0.01% to 5% by weight, with respect to the overall composition,
 c. at least one infrared absorbing agent in an amount ranging from 10% to 90% by weight, with respect to the overall composition.

Said polymerization process in aqueous suspension is preferably carried out also in the presence of inorganic salts of phosphoric acid, more preferably tricalcium phosphate or magnesium phosphate/pyrophosphate. Said inorganic salts of phosphoric acid can be added to the polymerization mixture already finely subdivided or they can be synthesized in situ by reaction, for example, between sodium pyrophosphate and magnesium sulfate.

The polymerization can also be carried out in the presence of further organic suspending agents such as polyvinylpyrrolidone or polyvinyl alcohol.

The initiator system used in the polymerization process in suspension described and claimed in the present text, comprises two peroxides, the first having a half-life of an hour at 85-95° C. and the other having a half-life of an hour at 110-120° C. Examples of these initiators are tert-Butyl peroxide-2-ethylhexanoate and terbutylperbenzoate.

The self-extinguishing expandable composition of polymers and/or copolymers obtained has an average molecular weight Mw ranging from 50,000 to 300,000, preferably from 70,000 to 220,000. In general, greater details on processes for the preparation of expandable vinyl aromatic polymers or copolymers in aqueous solution, or more generally on polymerization in suspension, can be found in Journal of Macromolecular Science, Review in Macromolecular Chemistry and Physics C31 (263) 215-299 (1991).

In order to improve the stability of the suspension, the viscosity of the reagent solution, comprising the monomer, can be increased, by dissolving vinyl aromatic polymer in the suspension, in a concentration ranging from 1% to 30% by weight, preferably from 5% to 20%, calculated with respect to the monomer alone. The solution can be obtained either by dissolving a preformed polymer (for example fresh polymer or rejects of previous polymerizations and/or expansions), in the reagent mixture, or by mass pre-polymerizing the monomer, or mixture of monomers, until the above-mentioned concentrations are obtained, and then continuing the polymerization in aqueous suspension.

During the polymerization in suspension, further polymerization additives are adopted, typically used for producing expandable vinyl aromatic polymers, such as stabilizing agents of the suspension, chain-transfer agents, expansion adjuvants, nucleating gents, plasticizers, flame-retardant agents.

Furthermore, during the polymerization in suspension, organo-brominated compounds, organo-chlorinated compounds or halogenated polymers can be dosed, in order to provide the expanded end-products obtained by transformation of the expandable granules, with flame-retardant properties.

In the polymerization process in aqueous suspension, the expanding agents are preferably added during the polymerization phase, or subsequently by means of the re-suspension technology. The expanding agents are selected from aliphatic or cycloaliphatic hydrocarbons containing 3 to 6 carbon atoms such as n-pentane, iso-pentane, cyclopentane or mixtures thereof; halogenated derivatives of aliphatic hydrocarbons containing from 1 to 3 carbon atoms, such as, for example, dichlorodifluoromethane, 1,2,2-trifluoroethane, 1,1,2-trifluoroethane; carbon dioxide and water.

At the end of the polymerization process in aqueous suspension, possibly at the end of the re-suspension, substantially spherical polymer granules are obtained, with an average diameter ranging from 0.2 to 3 mm. Said expandable granules contain compounds containing epoxy functional groups in quantities not higher than 0.5% w/w, preferably not higher than 0.2% w/w, and infrared absorbing agents in a quantity ranging from 0.05% by weight to 25% by weight. When the flame-retardant is tetrabromobisphenol A bis-2,3 dibromopropylether, its content in the expandable granules ranges from 1 to 6% by weight.

The expanding agent and possible additives are homogeneously dispersed in the expandable granules obtained.

The granules are then discharged from the polymerization reactor and washed, in continuous or batchwise, with non-ionic surfactants or, alternatively, with acids, as described in patent U.S. Pat. No. 5,041,465. The polymer granules can be thermally treated with hot air at a temperature ranging from 30 to 60° C.

EXAMPLES

Tables 1 and 2 compare the results of the analyses effected on various samples obtained with Examples 1-7 and comparative examples 1-6, relating to:
a) the concentration of HBr present in the expandable polystyrene granules,
b) the flame-retardant test (DIN 4102 B2),
c) the characteristics in compression of the expanded polystyrene articles.

The evaluations refer to samples of expandable polystyrene (EPS) containing hexabromocyclododecane (EBCD or HBCD) and tetrabromobisphenol A bis-2,3 dibromopropylether. Tables 1 and 2 also indicate the results obtained using petroleum coke characterized by different degrees of purity.

In the tables, TBBA is Tetrabromobisphenol A bis-2,3 dibromopropylether.

Comparative Example 1

89.8 parts of ethylbenzene, 853.8 parts of styrene, 56.2 parts α-methylstyrene, 0.2 parts divinylbenzene (total: 1000 parts) are fed to a stirred reactor. The reaction is carried out at 125° C. with an average residence time of 2 hours.

The outgoing fluid composition is then fed to a second reactor where the reaction is completed at 135° C. with an average residence time of 2 hours. The reactive polymeric composition, having a conversion of 72%, is heated to 240° C. and subsequently fed to the devolatilizer to remove the solvent and residual monomer. The resulting composition has a glass transition temperature of 104° C., a Melt Flow Index (MFI 200° C., 5 kg) of 8 g/10', a molecular weight Mw of 200,000 g/mol and a Mw/Mn ratio of 2.8, wherein Mw is the weight average molecular weight and Mn is the number average molecular weight.

The composition thus obtained is collected in a heated tank and fed to a heat exchanger to lower its temperature to 190° C. (main stream).

425 parts of polystyrene N2982 (Versalis), 87 parts of HBCD Saytex HP 900 (hexabromocyclododecane sold by Albemarle), 10 parts of Perkadox 30 (2,3-dimethyl-2,3-diphenylbutane, sold by Akzo Nobel) and 478 parts of a concentrate of material (Masterbatch) consisting of 50% w/w of calcined petroleum coke and the remaining 50% w/w of Polystyrene (N1782 Versalis), are fed to a twin-screw extruder.

The concentrate of material containing calcined petroleum coke (Master Batch), is produced with an extruder in which 50 parts of polystyrene N1782 (Versalis), in the molten state, are mixed with 50 parts of "Calcinated petroleum Coke PC6" produced by Timcal, with an ash content equal to 0.15% w/w. The polymeric composition comprising Polystyrene, the Master Batch of coke Timcal PC6, HBCD and Perkadox 30 forms the secondary stream (SIDE STREAM).

A gear pump increases the pressure of the molten polymeric composition to 260 bar.

230 parts of the polymeric composition forming the secondary polymeric stream (SIDE STREAM) are added to 770 parts of the composition coming from the heat exchanger (main stream).

The mixing is completed by means of static mixers, at a temperature of about 190° C. 47 parts of a mixture of n-pentane (75%) and iso-pentane (25%) are then pressurized and injected into the polymer in the molten state.

The ingredients are then mixed by means of static mixing elements for a calculated average time (residence) of 7 minutes. The composition is then distributed to the die, where it is extruded through a number of holes having a diameter of 0.5 mm, immediately cooled with a jet of water and cut with a series of rotating knives (according to patent application US 2005/0123638). The granulation pressure is 5 bar and the shear deformation rate is selected so as to obtain granulates having an average diameter of 1.2 mm. Water is used as spraying liquid and nitrogen as carrier gas. The ratio between the flow-rate of water sprayed and the flow-rate of the polymeric mass is 30 and that between the nitrogen and polymeric mass is 20. The temperature of the water is 40° C.

The resulting granulated beads are dried with a centrifugal drier and then coated with a coating. The coating is prepared by adding to the same, 3 parts of glyceryl monostearate, 1 part of zinc stearate and 0.2 parts of glycerine per 1,000 parts of dried granulated beads. The coating additives are mixed with the granulate by means of a continuous worm-screw mixer. The beads are then expanded and moulded. The thermal conductivity of the end-products obtained proved to be 30.4 mW/mK at 16.4 g/l (according to the method ISO 8301). Some sheets obtained from the end-products were introduced into an oven at 70° C. for 2 days: test samples were then collected (9 cm×19 cm×2 cm) for the fire behaviour test according to the standard DIN 4102 B2. The test-samples passed the fire-behaviour test.

The expandable beads thus obtained are analyzed to quantify the bromides present in the polymer. The bromide content in the EPS beads is an index of the degradation undergone by the organobrominated agent introduced into the polymer as flame-retardant. The EPS beads thus obtained have 2080 ppm of bromides. The cell structure evaluated on the expanded end-products proved to be homogeneous.

The mechanical characteristics in compression were tested with a Zwick I 2020 tensometer, according to the method EN 826. Two test-samples (100×100×50 mm) were collected from the expanded end-products and tested at 5 mm/min. The average value at 10% of compression proved to be the following: 86 Kpa (pressure at which the test-sample becomes deformed) at a density of 16.4 g/l.

Comparative Example 2

Comparative example 1 was repeated, introducing into a secondary or side polymeric stream (SIDE STREAM), 3% w/w of a styrene-glycidylmethacrylate copolymer (Mw of about 20,000, Epoxy Equivalent=310 g/eq), called Marproof G-0250 SP, produced by NOF Corporation (Oleo & Chemicals Div).

The secondary polymeric stream was therefore obtained by mixing, in a twin-screw extruder, 377 parts of polystyrene N2982 (Polimeri Europa), 87 parts of HBCD Saytex HP 900 (hexabromocyclododecane sold by Albemarle), 10 parts of Perkadox 30 (2,3-dimethyl-2,3-diphenylbutane, sold by Akzo Nobel), 478 parts of a concentrate of material (Masterbatch) consisting of 50% w/w of calcined petroleum coke Timcal PC 6 and the remaining 50% w/w of Polystyrene (N1782 Versalis) and parts of a styrene-glycidylmethacrylate copolymer (Mw of about 20,000, Epoxy Equivalent=310 g/eq), called Marproof G-0250 SP, produced by NOF Corporation (Oleo & Chemicals Div).

The concentrate of material containing calcined petroleum coke (Master Batch), is produced with the help of an extruder, in which 50 parts of polystyrene N1782 (Versalis) are mixed with 50 parts of "Calcinated petroleum Coke PC6" produced by Timcal.

The polymeric composition comprising polystyrene, the masterbatch of coke, HBCD and Perkadox 30 and the styrene-glycidylmethacrylate copolymer (Mw about 20,000, Epoxy Equivalent=310 g/eq), called Marproof G-0250 SP, produced by NOF Corporation (Oleo & Chemicals Div), forms the so-called secondary stream (SIDE STREAM).

A gear pump increases the pressure of the feeding of the molten additive to 260 bar.

230 parts of the polymeric composition forming the secondary polymeric stream (SIDE STREAM) are added to 770 parts of the composition coming from the heat exchanger (main polymeric stream).

The mixing is completed by means of static mixers, at a temperature of about 190° C. 47 parts of a mixture of n-pentane (75%) and iso-pentane (25%) are then pressurized and injected into the polymer in the molten state. As described in comparative example 1, the polymeric composition also containing the epoxy phenol resin then reaches the die where expandable granulates are obtained, having an average diameter of about 1.2 mm. The granules are then dried and treated with the coating whose types and quantities are those used in comparative example 1. The beads produced are expanded and moulded. The thermal conductivity of the end-products obtained proved to be 30.6 mW/mK at a density of 16.2 g/l. Some sheets obtained from the end-products were introduced into an oven at 70° C. for 2 days: test samples were then collected (9 cm×19 cm×2 cm) for the fire-behaviour test according to the standard DIN 4102 B2. The test-samples passed the fire-behaviour test.

Analysis effected on the dried EPS beads without a coating confirms the presence of 310 ppm of bromides.

The mechanical characteristics in compression were tested with a Zwick I 2020 tensometer, according to the method EN 826. Two test-samples (100×100×50 mm) were collected from the expanded end-products and tested at 5 mm/min. The average value at 10% of compression proved to be the following: 88 Kpa at a density of 16.2 g/l.

Comparative Example 3

Comparative example 2 was repeated, introducing into a secondary or side polymeric stream (SIDE STREAM), a calcined petroleum coke (Asbury grade 4023) characterized by a reduced degree of purity (ash content equal to 0.96%). The secondary polymeric stream was therefore obtained by mixing, in a twin-screw extruder, 377 parts of polystyrene N2982 (Polimeri Europa), 87 parts of HBCD Saytex HP 900 (hexabromocyclododecane sold by Albemarle), 10 parts of Perkadox 30 (2,3-dimethyl-2,3-diphenylbutane, sold by Akzo Nobel), 478 parts of a concentrate of material (Masterbatch) consisting of 50% w/w of calcined petroleum coke Asbury 4357 and the remaining 50% w/w of Polystyrene (N1782 Versalis) and 48 parts of a styrene-glycidylmethacrylate copolymer (Mw of about 20,000, Epoxy Equivalent=310 g/eq), called Marproof G-0250 SP, produced by NOF Corporation (Oleo & Chemicals Div).

The concentrate of material containing calcined petroleum coke (Master Batch), is produced with the help of an extruder, in which 50 parts of polystyrene N1782 (Versalis) are mixed with 50 parts of "Calcinated petroleum Coke 4023" produced by Asbury.

The polymeric composition comprising polystyrene, the masterbatch of coke 4023, HBCD and Perkadox 30 and the styrene-glycidylmethacrylate copolymer (Mw about 20,000, Epoxy Equivalent=310 g/eq), called Marproof G-0250 SP, produced by NOF Corporation (Oleo & Chemicals Div), forms the so-called secondary stream (SIDE STREAM).

A gear pump increases the pressure of the feeding of the molten additive to 260 bar.

230 parts of the polymeric composition forming the secondary polymeric stream (SIDE STREAM) are added to 770 parts of the composition coming from the heat exchanger (main polymeric stream).

The mixing is completed by means of static mixers, at a temperature of about 190° C. 47 parts of a mixture of n-pentane (75%) and iso-pentane (25%) are then pressurized and injected into the polymer in the molten state. As described in comparative example 1, the polymeric composition also containing the epoxy phenol resin then reaches the die where expandable granulates are obtained, having an average diameter of about 1.2 mm. The granules are then dried and treated with the coating whose types and quantities are those used in comparative example 1. The beads produced are expanded and moulded. The thermal conductivity of the end-products obtained proved to be 30.6 mW/mK at a density of 16.2 g/l. Some sheets obtained from the end-products were introduced into an oven at 70° C. for 2 days: test samples were then collected (9 cm×19 cm×2 cm) for the fire-behaviour test according to the standard DIN 4102 B2. The test-samples did not pass the fire-behaviour test.

Analysis effected on the dried EPS beads without a coating confirms the presence of 380 ppm of bromides.

The mechanical characteristics in compression were tested with a Zwick I 2020 tensometer, according to the method EN 826. Two test-samples (100×100×50 mm) were collected from the expanded end-products and tested at 5 mm/min. The average value at 10% of compression proved to be the following: 87 Kpa at a density of 16.2 g/l.

Example 1

Comparative example 1 was repeated, introducing into a secondary or side polymeric stream (SIDE STREAM), a Master Batch consisting of PS (N1782-versalis), petroleum coke with a high degree of purity (Timcal PC 6: ash content equal to 0.15% w/w) and a styrene-glycidylmethacrylate copolymer (Mw about 20,000, Epoxy Equivalent=310 g/eq), called Marproof G-0250 SP, produced by NOF Corporation (Oleo & Chemicals Div).

In this case, the concentrate of material containing petroleum coke (Master Batch), was produced by mixing, inside an extruder, 50 parts of polystyrene N1782 (Versalis), in the molten state, with 48.6 parts of "Calcinated petroleum Coke Timcal PC 6" (ash content lower than 0.2% w/w) and 1.4 parts of a styrene-glycidylmethacrylate copolymer (Mw about 20,000, Epoxy Equivalent=310 g/eq), called Marproof G-0250 SP, produced by NOF Corporation (Oleo & Chemicals Div).

The secondary polymeric stream (SIDE STREAM), was therefore obtained by mixing, in a twin-screw extruder, 425 parts of polystyrene N2982 (Polimeri Europa), 87 parts of HBCD Saytex HP 900 (hexabromocyclododecane sold by Albemarle), 10 parts of Perkadox 30 (2,3-dimethyl-2,3-diphenylbutane, sold by Akzo Nobel) and 478 parts of a concentrate of material (Masterbatch) consisting of 50% w/w of calcined petroleum coke Timcal PC6, 48.6% w/w of PS (N1782 Versalis) and 1.4% w/w of a styrene-glycidylmethacrylate copolymer called Marproof G-0250 SP, produced by NOF Corporation (Oleo & Chemicals Div).

A gear pump increases the pressure of the feeding of the molten additive to 260 bar.

230 parts of the polymeric composition forming the secondary polymeric stream (SIDE STREAM) are added to 770 parts of the composition coming from the heat exchanger (main polymeric stream).

The mixing is completed by means of static mixers, at a temperature of about 190° C. 47 parts of a mixture of n-pentane (75%) and iso-pentane (25%) are then pressurized and injected into the polymer in the molten state. As described in comparative example 1, the polymeric composition also containing the epoxy phenol resin then reaches the die where expandable granulates are obtained, having an average diameter of about 1.2 mm. The granules are then dried and treated with the coating whose types and quantities are those used in comparative example 1. The beads produced are expanded and moulded. The thermal conductivity of the end-products obtained proved to be 30.6 mW/mK at a density of 16.2 g/l. Some sheets obtained from the end-products were introduced into an oven at 70° C. for 2 days: test samples were then collected (9 cm×19 cm×2 cm) for the fire-behaviour test according to the standard DIN 4102 B2. The test-samples passed the fire-behaviour test.

Analysis effected on the dried EPS beads without a coating confirms the presence of 160 ppm of bromides.

The mechanical characteristics in compression were tested with a Zwick I 2020 tensometer, according to the method EN 826. Two test-samples (100×100×50 mm) were collected from the expanded end-products and tested at 5 mm/min. The average value at 10% of compression proved to be the following: 94 Kpa at a density of 16.2 g/l.

Example 2

Example 1 was repeated, introducing into a secondary or side polymeric stream (SIDE STREAM), a Master Batch consisting of polystyrene (N1782-versalis), petroleum coke with a reduced degree of purity (coke Asbury 4023: ash content higher than 0.96 w/w) and a resin called Stuktol Polydis 3735, produced by Schill-Seilacher. Polydis 3735 is a NovolaK multifunctional organophosphorus epoxy resin, obtained by reacting 9,10 dihydro-9-oxa-10-phospho-phenanthrene-10-oxide with multifunctional epoxy resins.

In this example, the concentrate of material containing petroleum coke (Master Batch), was produced by mixing, inside an extruder, 50 parts of polystyrene N1782 (Versalis), in the molten state, with 48.6 parts of "Calcinated petroleum Coke Asbury 4023" and 1.4 parts of Stuktol Polydis 3735.

The secondary polymeric stream (SIDE STREAM), was therefore obtained by mixing, in a twin-screw extruder, 425 parts of polystyrene N2982 (Polimeri Europa), 87 parts of HBCD Saytex HP 900 (hexabromocyclododecane sold by Albemarle), 10 parts of Perkadox 30 (2,3-dimethyl-2,3-diphenylbutane, sold by Akzo Nobel) and 478 parts of a concentrate of material (Masterbatch) consisting of 50% w/w of calcined petroleum coke Asbury 4023, 48.64% w/w of PS (N1782 Versalis) and 1.4% w/w of Stuktol Polydis 3735.

A gear pump increases the pressure of the feeding of the molten additive to 260 bar.

230 parts of the polymeric composition forming the secondary polymeric stream (SIDE STREAM) are added to 770 parts of the composition coming from the heat exchanger (main polymeric stream).

The mixing is completed by means of static mixers, at a temperature of about 190° C. 47 parts of a mixture of n-pentane (75%) and iso-pentane (25%) are then pressurized and injected into the polymer in the molten state. As described in comparative example 1, the polymeric composition also containing the epoxy phenol resin then reaches the die where expandable granulates are obtained, having an average diameter of about 1.2 mm. The granules are then dried and treated with the coating whose types and quantities are those used in comparative example 1. The beads produced are expanded and moulded. The thermal conductivity of the end-products obtained proved to be 30.8 mW/mK at a density of 16.6 g/l. Some sheets obtained from the end-products were introduced into an oven at 70° C. for 2 days: test samples were then collected (9 cm×19 cm×2 cm) for the fire-behaviour test according to the standard DIN 4102 B2. The test-samples passed the fire-behaviour test.

Analysis effected on the dried EPS beads without a coating confirms the presence of 180 ppm of bromides.

The mechanical characteristics in compression were tested with a Zwick I 2020 tensometer, according to the method EN 826. Two test-samples (100×100×50 mm) were collected from the expanded end-products and tested at 5 mm/min. The average value at 10% of compression proved to be the following: 92 Kpa at a density of 16.2 g/l.

Comparative Example 4

Comparative example 1 was repeated, introducing into a secondary polymeric stream (SIDE STREAM), the same type of Master Batch consisting of polystyrene (N1782

Versalis), petroleum coke with a high degree of purity (coke Timcal PC6: ash content lower than 0.2% w/w), but in this case, the flame-retardant hexabromocyclododecane was substituted with tetrabromobisphenol A bis-2,3 dibromopropylether.

The concentrate of material containing petroleum coke (Master Batch), was produced by mixing, inside an extruder, 50 parts of polystyrene N1782 (Versalis), in the molten state, with 50 parts of "Calcinated petroleum Coke Timcal PC 6".

The secondary polymeric stream (SIDE STREAM), was therefore obtained by mixing, in a twin-screw extruder, 348 parts of polystyrene N2982 (Polimeri Europa), 164 parts of tetrabromobisphenol A bis-2,3 dibromopropylether (PE68 sold by Albemarle), 10 parts of Perkadox 30 (2,3-dimethyl-2,3-diphenylbutane, sold by Akzo Nobel) and 478 parts of a concentrate of material (Masterbatch) consisting of 50% w/w of calcined petroleum coke Timcal PC 6, and 50% w/w of PS (N1782 Versalis).

A gear pump increases the pressure of the feeding of the molten additive to 260 bar.

230 parts of the polymeric composition forming the secondary polymeric stream (SIDE STREAM) are added to 770 parts of the composition coming from the heat exchanger (main polymeric stream).

The mixing is completed by means of static mixers, at a temperature of about 190° C. 47 parts of a mixture of n-pentane (75%) and iso-pentane (25%) are then pressurized and injected into the polymer in the molten state. As described in comparative example 1, the polymeric composition also containing the epoxy phenol resin then reaches the die where expandable granulates are obtained, having an average diameter of about 1.2 mm. The granules are then dried and treated with the coating whose types and quantities are those used in comparative example 1. The beads produced are expanded and moulded. The thermal conductivity of the end-products obtained proved to be 30.3 mW/mK at a density of 15.9 g/l. Some sheets obtained from the end-products were introduced into an oven at 70° C. for 2 days: test samples were then collected (9 cm×19 cm×2 cm) for the fire-behaviour test according to the standard DIN 4102 B2. The test-samples passed the fire-behaviour test.

Analysis effected on the dried EPS beads without a coating confirms the presence of 260 ppm of bromides.

The mechanical characteristics in compression were tested with a Zwick I 2020 tensometer, according to the method EN 826. Two test-samples (100×100×50 mm) were collected from the expanded end-products and tested at 5 mm/min. The average value at 10% of compression proved to be the following: 90 Kpa at a density of 16.2 g/l.

Comparative Example 5

Comparative example 1 was repeated, introducing into a secondary or side polymeric stream (SIDE STREAM), a Master Batch consisting of PS (N1782 Versalis) and petroleum coke with a reduced degree of purity (coke Asbury 4357: ash content=0.88% w/w); in addition, the flame-retardant hexabromocyclododecane was substituted with tetrabromobisphenol A bis-2,3 dibromopropylether.

The concentrate of material containing petroleum coke (Master Batch), was produced by mixing, inside an extruder, 50 parts of polystyrene N1782 (Versalis), in the molten state, with 50 parts of "Calcinated petroleum Coke Asbury 4357".

The secondary polymeric stream (SIDE STREAM), was obtained by mixing, in a twin-screw extruder, 348 parts of polystyrene N2982 (Polimeri Europa), 164 parts of tetrabromobisphenol A bis-2,3 dibromopropylether (PE68 sold by Albemarle), 10 parts of Perkadox 30 (2,3-dimethyl-2,3-diphenylbutane, sold by Akzo Nobel) and 478 parts of a concentrate of material (Masterbatch) consisting of 50% w/w of calcined petroleum coke Asbury 4357, and 50% w/w of PS (N1782 Versalis).

A gear pump increases the pressure of the feeding of the molten additive to 260 bar.

230 parts of the polymeric composition forming the secondary polymeric stream (SIDE STREAM) are added to 770 parts of the composition coming from the heat exchanger (main polymeric stream).

The mixing is completed by means of static mixers, at a temperature of about 190° C. 47 parts of a mixture of n-pentane (75%) and iso-pentane (25%) are then pressurized and injected into the polymer in the molten state. As described in comparative example 1, the polymeric composition also containing the epoxy phenol resin then reaches the die where expandable granulates are obtained, having an average diameter of about 1.2 mm. The granules are then dried and treated with the coating whose types and quantities are those used in comparative example 1. The beads produced are expanded and moulded. The thermal conductivity of the end-products obtained proved to be 30.5 mW/mK at a density of 16.4 g/l. Some sheets obtained from the end-products were introduced into an oven at 70° C. for 2 days: test samples were then collected (9 cm×19 cm×2 cm) for the fire-behaviour test according to the standard DIN 4102 B2. The test-samples passed the fire-behaviour test.

Analysis effected on the dried EPS beads without a coating confirms the presence of 280 ppm of bromides.

The mechanical characteristics in compression were tested with a Zwick I 2020 tensometer, according to the method EN 826. Two test-samples (100×100×50 mm) were collected from the expanded end-products and tested at 5 mm/min. The average value at 10% of compression proved to be the following: 91 Kpa at a density of 16.4 g/l.

Example 3

Comparative example 2 was repeated, introducing into a secondary or side polymeric stream (SIDE STREAM), the same type of Master Batch consisting of polystyrene (N1782 Versalis), petroleum coke with a high degree of purity (coke Timcal PC6: ash content lower than 0.2% w/w), but in this case, the flame-retardant hexabromocyclododecane was substituted with tetrabromobisphenol A bis-2,3 dibromopropylether and an epoxy resin called Stuktol Polydis 3735, produced by Schill-Seilacher, was also dosed.

The concentrate of material containing petroleum coke (Master Batch), was produced by mixing, inside an extruder, 50 parts of polystyrene N1782 (Versalis), in the molten state, with 50 parts of "Calcinated petroleum Coke Timcal PC 6".

The secondary polymeric stream (SIDE STREAM), was obtained by mixing, in a twin-screw extruder, 300 parts of polystyrene N2982 (Polimeri Europa), 164 parts of tetrabromobisphenol A bis-2,3 dibromopropylether (PE68 sold by Albemarle), 10 parts of Perkadox 30 (2,3-dimethyl-2,3-diphenylbutane, sold by Akzo Nobel), 478 parts of a concentrate of material (Masterbatch) consisting of 50% w/w of calcined petroleum coke Timcal PC 6, 50% w/w of PS (N1782 Versalis) and 48 parts of Stuktol Polydis 3735.

A gear pump increases the pressure of the feeding of the molten additive to 260 bar.

230 parts of the polymeric composition forming the secondary polymeric stream (SIDE STREAM) are added to 770 parts of the composition coming from the heat exchanger (main polymeric stream).

The mixing is completed by means of static mixers, at a temperature of about 190° C. 47 parts of a mixture of n-pentane (75%) and iso-pentane (25%) are then pressurized and injected into the polymer in the molten state. As described in comparative example 1, the polymeric composition also containing the epoxy phenol resin then reaches the die where expandable granulates are obtained, having an average diameter of about 1.2 mm. The granules are then dried and treated with the coating whose types and quantities are those used in comparative example 1. The beads produced are expanded and moulded. The thermal conductivity of the end-products obtained proved to be 30.5 mW/mK at a density of 16.4 g/l. Some sheets obtained from the end-products were introduced into an oven at 70° C. for 2 days: test samples were then collected (9 cm×19 cm×2 cm) for the fire-behaviour test according to the standard DIN 4102 B2. The test-samples passed the fire-behaviour test.

Analysis effected on the dried EPS beads without a coating confirms the presence of 130 ppm of bromides.

The mechanical characteristics in compression were tested with a Zwick I 2020 tensometer, according to the method EN 826. Two test-samples (100×100×50 mm) were collected from the expanded end-products and tested at 5 mm/min. The average value at 10% of compression proved to be the following: 92 Kpa at a density of 16.4 g/l.

Example 4

Comparative example 2 was repeated, introducing into a secondary polymeric stream (SIDE STREAM), a Master Batch consisting of PS (N1782 Versalis), petroleum coke with a reduced degree of purity (coke Asbury 4357: ash content=0.86% w/w), produced using an epoxy resin called Stuktol Polydis 3735 (Schill-Seilacher). In this example, however, the flame-retardant hexabromocyclododecane was substituted with tetrabromobisphenol A bis-2,3 dibromopropylether.

In this example, the concentrate of material containing petroleum coke (Master Batch), was produced by mixing, inside an extruder, 50 parts of polystyrene N1782 (Versalis), in the molten state, with 48.6 parts of "Calcinated petroleum Coke Asbury 4357" and 1.4 parts of Polydis 3735 (Schill-Seilacher).

The secondary polymeric stream (SIDE STREAM), was obtained by mixing, in a twin-screw extruder, 356 parts of polystyrene N2982 (Polimeri Europa), 156 parts of tetrabromobisphenol A bis-2,3 dibromopropylether (PE68 sold by Albemarle), 10 parts of Perkadox 30 (2,3-dimethyl-2,3-diphenylbutane, sold by Akzo Nobel) and 478 parts of a concentrate of material (Masterbatch) consisting of 48.6% w/w of calcinated petroleum coke Asbury 4357, 50% w/w of PS (N1782 Versalis) and 1.4% w/w of Polydis 3735.

A gear pump increases the pressure of the feeding of the molten additive to 260 bar.

230 parts of the polymeric composition forming the secondary polymeric stream (SIDE STREAM) are added to 770 parts of the composition coming from the heat exchanger (main polymeric stream).

The mixing is completed by means of static mixers, at a temperature of about 190° C. 47 parts of a mixture of n-pentane (75%) and iso-pentane (25%) are then pressurized and injected into the polymer in the molten state. As described in comparative example 1, the polymeric composition also containing the epoxy phenol resin then reaches the die where expandable granulates are obtained, having an average diameter of about 1.2 mm. The granules are then dried and treated with the coating whose types and quantities are those used in comparative example 1. The beads produced are expanded and moulded. The thermal conductivity of the end-products obtained proved to be 30.4 mW/mK at a density of 16.3 g/l. Some sheets obtained from the end-products were introduced into an oven at 70° C. for 2 days: test samples were then collected (9 cm×19 cm×2 cm) for the fire-behaviour test according to the standard DIN 4102 B2. The test-samples passed the fire-behaviour test.

Analysis effected on the dried EPS beads without a coating confirms the presence of 60 ppm of bromides.

The mechanical characteristics in compression were tested with a Zwick I 2020 tensometer, according to the method EN 826. Two test-samples (100×100×50 mm) were collected from the expanded end-products and tested at 5 mm/min. The average value at 10% of compression proved to be the following: 95 Kpa at a density of 16.4 g/l.

Comparative Example 6

Process in Aqueous Suspension

A mixture of 150 parts by weight of water, 0.2 parts of sodium pyrophosphate, 89 parts of styrene, 0.25 parts of tert-butylperoxy-2-ethylhexanoate, 0.25 parts of tert-butylperbenzoate and 11 parts of a concentrate of material (Masterbatch) consisting of 50% w/w of Calcinated Carbon Coke 4023 sold by Asbury Graphite Mills Inc. (USA) with a particle size MT50% of about 5 µm, a BET of about 20 m$^2$/g, a sulfur content of about 1.1% and the remaining 50% w/w of polystyrene N2982(Versalis), are charged into a closed stirred container. 1.4 parts of hexabromocyclododecane, Saytex HP900 sold by Albemarle and 0.3% of dicumylperoxide are then added to make the product fireproof. The mixture is heated to 90° C. under stirring.

After about 2 hours at 90° C., 4 parts of a solution at 10% of polyvinylpyrrolidone are added. The mixture is heated, under constant stirring, for a further 2 hours to 100° C., 7 parts of a 70/30 mixture of n-pentane and i-pentane are added, the mixture is heated for a further 4 hours to 125° C. and then cooled, and the batch is discharged. The granules of expandable polymer thus produced are subsequently recovered and washed with demineralized water containing 0.05% of a non-ionic surfactant consisting of a fatty alcohol condensed with ethylene oxide and propylene oxide, sold by Huntsman under the trade-name of Empilan 2638. The granules are then dried in a stream of warm air, 0.02% of a non-ionic surfactant, consisting of a condensate of ethylene oxide and propylene oxide on a glycerine base, sold by Dow (Voranol CP4755) is added, and the granules are then sieved, separating the fraction with a diameter ranging from 1 to 1.5 mm. Said fraction proves to be 40%, the fraction ranging from 0.5 to 1 mm being 30%, the fraction ranging from 0.2 to 0.5 mm 15% and the coarse fraction ranging from 1.5 to 3 mm 15%. 0.2% by weight of glycerylmonostearate and 0.1% by weight of zinc stearate are then added to the fraction ranging from 1 to 1.5 mm. The product is pre-expanded with vapour at a temperature of 100° C., aged for a day and used for the moulding of blocks (dimensions 1040×1030×550 mm). The blocks were then cut to prepare flat sheets on which the thermal conductivity was measured. The thermal conductivity, measured after a residence of 5 days in an oven at 70° C., was 30.6 mW/mK at a density of 16.4 g/l (measurement effected according to the standard DIN 52612).

The test-samples pass the flame-retardant test effected according to the standard DIN 4102 B2.

The mechanical characteristics in compression were tested with a Zwick I 2020 tensometer, according to the method EN 826. Two test-samples (100×100×50 mm) were collected from the expanded end-products and tested at 5 mm/min. The average value at 10% of compression proved to be the following: 91 Kpa (pressure at which the test-sample becomes deformed) at a density of 16.49 g/l Analysis effected on the dried EPS beads without a coating confirms the presence of 60 ppm of bromides.

Example 5

Process in Aqueous Suspension

A mixture of 150 parts by weight of water, 0.2 parts of sodium pyrophosphate, 89 parts of styrene, 0.25 parts of tert-butylperoxy-2-ethylhexanoate, 0.25 parts of tert-butylperbenzoate and 11 parts of a polymer concentrate (Masterbatch) prepared by mixing in an extruder: 50% w/w of "Calcinated Carbon Coke 4023" sold by Asbury Graphite Mills Inc. (USA) (with a particle size MT50% of about 5 μm, a BET of about 20 m$^2$/g, a sulfur content of about 1.1%), 48.5% w/w of 1.5% w/w of styrene-glycidylmethacrylate copolymer MarprooF G-0250SP sold by NOF Corportaion (Mw about 20,000 and WPE (Epoxy equivalent)=310 g/eq, are charged into a closed stirred container. 2.2 parts of tetrabromobisphenol A bis-2,3 dibromopropylether, called PE 68, sold by Chemtura PE and 0.3% of dicumylperoxide are then added to make the product fireproof. The mixture is heated to 90° C. under stirring.

After about 2 hours at 90° C., 4 parts of a solution at 10% of polyvinylpyrrolidone are added. The mixture is heated, under constant stirring, for a further 2 hours at 100° C., 7 parts of a 70/30 mixture of n-pentane and i-pentane are added, the mixture is heated for a further 4 hours at 125° C. and then cooled, and the batch is discharged. The granules of expandable polymer thus produced are subsequently recovered and washed with demineralized water containing 0.05% of a non-ionic surfactant consisting of a fatty alcohol condensed with ethylene oxide and propylene oxide, sold by Huntsman under the trade-name of Empilan 2638. The granules are then dried in a stream of warm air, 0.02% of non-ionic surfactant, consisting of a condensate of ethylene oxide and propylene oxide on a glycerine base, sold by Dow (Voranol CP4755) are added, and the granules are then sieved, separating the fraction with a diameter ranging from 1 to 1.5 mm. Said fraction proves to be 40%, the fraction ranging from 0.5 to 1 mm being 30%, the fraction ranging from 0.2 to 0.5 mm 15% and the coarse fraction ranging from 1.5 to 3 mm 15%. 0.2% of glycerylmonostearate and 0.1% of zinc stearate are then added to the fraction ranging from 1 to 1.5 mm. The product is pre-expanded with vapour at a temperature of 100° C., aged for a day and used for the moulding of blocks (dimensions 1040×1030×550 mm). The blocks were then cut to prepare flat sheets on which the thermal conductivity was measured. The thermal conductivity, measured after a residence of 5 days in an oven at 70° C., was 30.3 mW/mK at a density of 16.6 g/l (measurement effected according to the standard DIN 52612).

The test-samples pass the flame-retardant test effected according to the standard DIN 4102 B2.

The mechanical characteristics in compression were tested with a Zwick I 2020 tensometer, according to the method EN 826. Two test-samples (100×100×50 mm) were collected from the expanded end-products and tested at 5 mm/min. The average value at 10% of compression proved to be the following: 96 Kpa (pressure at which the test-sample becomes deformed) at a density of 16.4 g/l Analysis effected on the dried EPS beads without a coating confirms the presence of 15 ppm of bromides.

The description of the method for determining the bromides in the expandable polystyrene granules is provided hereunder.

The bromide ion is extracted in an aqueous solution from a solution of the sample of polymer in chloroform. The concentration of the bromide ion in the aqueous solution is then determined by ion chromatography. The concentration of the bromide ion in the polymer is calculated on the basis of the volume of aqueous solution and weight of the sample treated.

The sample conveniently weighed, is introduced into a test-tube with a screw stopper having a volume of 50 ml, 15 ml of chloroform are added and the mixture is stirred until the complete dissolution of the polymer.

At this point, 25 ml of an eluent solution for ion chromatography are introduced into the test-tube with a calibrated pipette, the test-tube is closed and the mixture stirred for about 20 minutes, after which the organic and aqueous phases in the test-tube are separated (about 20 minutes).

The upper aqueous phase is removed and analyzed by ion chromatography.

The concentration of bromide in the polystyrene is calculated as follows:

$$C_{Br^-}[\text{ppm}] = \frac{C_s \times V_s}{W_{sample}}$$

wherein:

$C_{Br^-}$: concentration of bromide in the polystyrene sample expressed in ppm (w/w);

$C_s$: concentration of bromide in the aqueous solution in ppm (w/v) obtained by chromatography;

$V_s$: volume of solution used for the extraction expressed in ml;

$W_{sample}$: weight of the initial polystyrene sample expressed as g.

TABLE 1

| Examples | Polystyrene (%) | Coke (%) | Ashes coke ASTM DIN 51903 (%) | EBCD (%) | TBBA (%) | Convention. Epoxy dosage (%) | Epoxy (dosage Master Batch) (%) | HBr Granules of EPS (ppm) | Fire test DIN 4102 B2 | Compression mechanical characteristics stress 10% Kpa (17 g/l) EN 826 |
|---|---|---|---|---|---|---|---|---|---|---|
| Comparative 1 | 92.9 | 5.2 | <0.2 | 1.9 | — | — | — | 2080 | OK | 86 |
| Comparative 2 | 91.8 | 5.2 | <0.2 | 1.9 | — | 1.1 (Marproof G0250SP) | — | 310 | OK | 88 |
| Comparative 3 | 91.8 | 5.2 | 0.96 | 1.9 | — | 1.1 (Marproof | | 380 | NO | 87 |

TABLE 1-continued

| Examples | Poly-styrene (%) | Coke (%) | Ashes coke ASTM DIN 51903 (%) | EBCD (%) | TBBA (%) | Convention. Epoxy dosage (%) | Epoxy (dosage Master Batch) (%) | HBr Granules of EPS (ppm) | Fire test DIN 4102 B2 | Compression mechanical characteristics stress 10% Kpa (17 g/l) EN 826 |
|---|---|---|---|---|---|---|---|---|---|---|
| Comparative 4 | 91.2 | 5.2 | <0.2 | — | 3.6 | G0250SP) | | 260 | OK | 90 |
| Comparative 5 | 91.2 | 5.2 | 0.88 | — | 3.6 | | | 280 | OK | 91 |
| Comparative 6 | 93 | 5.5 | | 1.4 | | | | 60 | OK | 91 |

TABLE 2

| Examples | Poly-styrene (%) | Coke (%) | Coke ashes ASTM DIN 51903 (%) | EBCD (%) | TBBA (%) | Convention. Epoxy dosage (%) | Epoxy (dosage Master Batch)) (%) | HBr Granules of EPS (ppm) | Fire test DIN 4102 B2 | Compression mechanical characteristics stress 10% Kpa (17 g/l) EN 826 |
|---|---|---|---|---|---|---|---|---|---|---|
| Example 1 | 92.9 | 5.1 | <0.2 | 1.9 | | | 0.15 (Marproof G0250SP) | 160 | OK | 94 |
| Example 2 | 92.9 | 5.1 | 0.96 | 1.9 | | | 0.15 (Polydis 3735) | 180 | OK | 92 |
| Example 3 | 90.1 | 5.2 | <0.2 | — | 3.6 | | 1.1 (Polydis 3735) | 130 | OK | 92 |
| Example 4 | 91.3 | 5.2 | 0.88 | — | 3.4 | | 0.15 (Polydis 3735) | 60 | OK | 95 |
| Example 5 | 92.3 | 5.5 | | 2.2 | | | 0.17 (Polydis 3735) | 15 | OK | 96 |

The invention claimed is:

1. A self-extinguishing expandable composition of vinyl aromatic polymers and/or copolymers comprising:
  A) vinyl aromatic polymers and/or copolymers in an amount equal to at least 50% by weight,
  B) at least one expanding agent,
  C) at least one infrared absorbing agent, that is petroleum coke, and the content of the infrared absorbing agent ranges from 0.05% by weight to 25% by weight,
  D) at least one halogenated flame-retardant agent,
  E) at least one compound containing epoxy functional groups characterized by a solubility in styrene, measured at a temperature of 25° C., higher than 5 g/100 g and present in a quantity not higher than 0.5% w/w selected from styrene-glycidylmethacrylate copolymers or from novolak multifunctional organophosphorus epoxy resins,
wherein the total weight percent content of all components is 100%.

2. The self-extinguishing expandable composition according to claim 1, wherein the compound containing epoxy functional groups is selected from epoxy resins having a solubility in vinyl aromatic monomer, measured at a temperature of 25° C., higher than 20 g/100 g.

3. The self-extinguishing expandable composition according to claim 1, wherein the petroleum coke has an ash content, measured according to the method ASTM DIN 51903, higher than 0.2% w/w and up to 5% w/w with respect to the infrared absorbing agent.

4. The self-extinguishing expandable composition according to claim 1, wherein the flame-retardant agent is selected from hexabromocyclododecane, tetrabromobisphenol A bis-2,3 dibromopropylether or brominated styrene-butadiene copolymers.

5. The self-extinguishing expandable composition according to claim 4, wherein the flame-retardant is tetrabromobisphenol A bis-2,3 dibromopropylether.

6. A process for the preparation in continuous mass of a self-extinguishing expandable composition according to claim 1, said process comprising the following steps:
  i. mixing the following compounds together:
    a. vinyl aromatic polymers and/or copolymers in amounts ranging from 10% to 90% by weight, with respect to the overall mixture,
    b. at least one compound containing epoxy functional groups in amounts ranging from 0.01% to 5% by weight with respect to the overall mixture,
    c. at least one infrared absorbing agent in amounts ranging from 10% to 90% by weight, with respect to the overall mixture,
  so as to form a concentrated polymeric composition;
  ii. incorporating said concentrated polymeric composition in a first stream containing vinyl aromatic polymers and/or copolymers in the molten state, at least one flame-retardant additive and at least one expanding agent so as to form a polymeric side stream;
  iii. if the vinyl aromatic polymer and/or copolymer is in granules, heating said polymer and/or copolymer to a temperature higher than the relative melting point, forming a molten stream before incorporating the flame-retardant additive and the expanding agent;

iv. incorporating said polymeric side stream together with the expanding agent, in a second polymeric stream, or main polymeric stream, containing vinyl aromatic polymers and/or copolymers in the molten state, thus forming the self-extinguishing expandable composition.

7. A polymerization process in aqueous suspension for preparing a self-extinguishing expandable composition according to claim 1, wherein the dosage of the infrared absorbing agents is obtained by incorporation, in a polymerization mixture, of a concentrated polymeric composition comprising:
   a. vinyl aromatic polymers and/or copolymers in an amount ranging from 10% to 90% by weight, with respect to the overall composition,
   b. at least one compound containing epoxy functional groups in an amount ranging from 0.01% to 5% by weight, with respect to the overall composition,
   c. at least one infrared absorbing agent in an amount ranging from 10% to 90% by weight, with respect to the overall composition.

8. Expandable granules containing the self-extinguishing expandable composition according to claim 1, wherein the compounds containing epoxy functional groups are present in an amount not exceeding 0.5% w/w and wherein the content of the infrared absorbing agent ranges from 0.05% by weight to 25% by weight.

9. Expandable granules according to claim 8, also containing tetrabromobisphenol A bis 2,3 dibromopropylether whose content ranges from 1 to 6% by weight.

10. Expanded articles containing the self-extinguishing expandable composition according to claim 1, having a density ranging from 5 to 50 g/l and a thermal insulation capacity, expressed by a thermal conductivity ranging from 25 mW/mK to 50 mW/mK, measured according to the standard DIN 52612.

11. The self-extinguishing expandable composition according to claim 1, wherein the flame-retardant agent is 1,1' (isopropylidene) bis[3,5-dibromo-4-(2,3-dibromo methyl-propoxy) benzene.

12. A self-extinguishing expandable composition of vinyl aromatic polymers and/or copolymers comprising:
   A) vinyl aromatic polymers and/or copolymers in an amount equal to at least 50% by weight of the total composition,
   B) at least one expanding agent,
   C) at least one infrared absorbing agent,
   D) at least one halogenated flame-retardant agent that is 1,1' (isopropylidene) bis[3,5-dibromo-4-(2,3-dibromo methyl-propoxy) benzene, and
   E) at least one compound containing epoxy functional groups characterized by a solubility in styrene, measured at a temperature of 25° C., higher than 5 g/100 g.

* * * * *